_United States Patent Office_ 3,491,225
Patented Jan. 20, 1970

3,491,225
SPECIAL WELDING ELECTRODES
Takeshi Oku, Suita-shi, Japan, assignor to Matsushita Electric Industrial Co., Ltd., Osaka, Japan, a corporation of Japan
Filed Mar. 15, 1967, Ser. No. 623,425
Int. Cl. B23k *35/22*
U.S. Cl. 219—146          7 Claims

ABSTRACT OF THE DISCLOSURE

Special welding electrode consisting of a composite wire and adapted for use in $CO_2$ shield gas arc welding, said welding electrode comprising a casing having a central hollow and a filler enclosed in said central hollow, the cross sectional area of said hollow being not larger than 25% of the entire cross sectional area of the electrode and said filler being composed of 30 to 60 parts by weight of ferromanganese, 20 to 40 parts by weight of ferrosilicon, not more than 10 parts by weight of ferrotitanium, not more than 15 parts by weight of ferroaluminum and 1 to 10 parts by weight of an arc stabilizer.

---

The present invention relates to a special welding electrode, more particularly to a special composite type welding electrode which is advantageous economically and exhibits an excellent weldability and which is adapted for use in consumable electrode shield gas arc welding primarily using such gas as $CO_2$.

Various kinds of composite type welding electrodes (hereinafter referred to as composite wire) have been proposed heretofore as electrodes for use in consumable electrode shield gas arc welding using such gas as $CO_2$, and they are generally categorized into those which are represented by the type disclosed in Japanese Patent No. 299,057 and those which are represented by the type disclosed in Japanese Patent No. 288,405. These conventional forms of composite type welding electrodes, however, are not entirely satisfactory due to the drawbacks which will be described hereinafter.

The present invention, therefore, proposes a new wilding electrode which is free from the conventional drawbacks and which will be described hereinafter in comparison with the conventional ones with reference to the accompanying drawings, in which.

Description will first be given on the composite wire disclosed by Japanese Patent No. 299,057 with reference to FIG. 1, which represents one form of the conventional welding electrodes.

Figure 1:
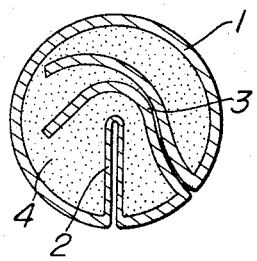
FIG. 1 is a transverse cross section of one form of the conventional welding electrode.

Referring to FIG. 1, there is shown a cross sectional view of the composite wire composed of a metal casing 1 of, e.g. mild steel, interior fins 2 and 3 formed with said metal casing and a filler 4 consisting of a mixed powder of a slag-forming composition with deoxidizers, said slag-forming composition being composed of compounds such as $TiO_2$, $MnO$, $SiO_2$, iron oxides, aluminas and alkalis. Moreover, according to this patent, it is described that the amount of the filler 4 must be within the range from 24 to 42% of the metallic portions 1, 2 and 3 and further a total weight of the interior fins 2 and 3 must be greater than the weight of the casing 1.

In case of the composite wires of the structure wherein a filler composed of a slag-forming composition and deoxidizers is packed interior of a metal casing, so that the bead resulting from welding will be covered uniformly with a sufficient amount of slag, the amount of the filler must be larger than about 20% but not exceeding 40% because this will render the arc unstable, as stated in said patent. Furthermore, the interior fins are of great significance for the metal casing and, because of the presence of said fins, it is only possible to obtain a highly stable arc, to minimize the occurrence of spattering and to avoid such objectionable phenomenon as that wherein the metal casing only is molten first during the welding operation, with the filler interior of the metal casing remaining unmelted and projecting from said metal casing. The composite wire of the type described, which contains a relatively large amount of slag-forming composition in the filler, is capable of forming a bead having a beautiful appearance and a good shape, but, on the other hand, in order to improve the useability, it is necessary for the composite wire to have a structure as shown in FIG. 1. Such a composite wire, therefore, involves a number of problems in its manufacture and also is not economically advantageous. In addition, the composite wire of this type has the drawback that it is low in deposition efficiency, small in deposition rate and is not entirely satisfactory in weld penetration, due to the fact that it contains a large amount of filler and that high current density cannot be employed due to its diameter.

Description will next be given on another form of the composite wires represented by the one disclosed in Japanese Patent No. 288,405, with reference to FIG. 2.

Referring to this figure, which illustrates, in transverse cross section, the composite wire of the form described, the composite wire comprises a tubular metal casing 5 formed mainly with a mild steel sheet and a filler 6 enclosed therein consisting of a non-hygroscopic fluxing composition suitable for the formation of a hydrogen-free slag, deoxidizers, alloying elements and a metallic powder of the same composition as the metal casing.

Figure 2:
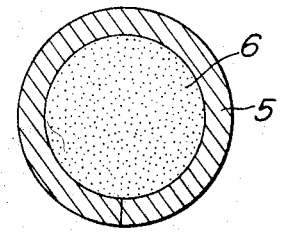
FIG. 2 is a transverse cross section, similar to FIG. 1, of another form of the conventional welding electrode.

The structure shown in FIG. 2 is not particularly new, but has been widely known conventionally by being referred to as the Bernard method. The characteristic features of this composite wire, therefore, does not lie in its structure proper, but in the filler which contains a large amount of a metallic power having the same composition as the metal casing, in addition to the conventionally used slag-forming composition and deoxidizers.

As stated previously, with the structure shown in FIG. 2, use of only the slag-forming composition and the deoxidizers as a filler would result in a poor weldability, that is, the frequent occurrence of spattering, and an unstable arc.

These drawbacks may be obviated by containing a sufficiently large amount of metallic powder in the filler. Namely, by containing a metallic powder in an amount of the order of 50% or higher in the filler, it is possible to markedly stabilize the arc and to drastically reduce spattering. As compared with the composite wire of the structure shown in FIG. 1, this kind of composite wire is advantageous in that it is simple in structure and is superior in both deposition efficiency and deposition rate, owing to the large amount of metallic powder contained in the filler, but, on the other hand, there is the drawback of requiring a metallic powder of relatively high purity and fine particle size, rendering the composite wire disadvantageous from the economical point of view.

The present invention contemplates providing a composite wire which is adapted for use in an atmosphere consisting primarily of $CO_2$ and which is simple in structure and provides an excellent weldability efficiency and economical advantage to be obtained as compared with the conventional welding electrodes as described hereinabove.

Figure 3:
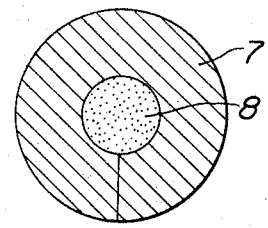
FIG. 3 is a transverse cross section of the special welding electrode according to the present invention.

The structure of the inventive composite wire is shown in FIG. 3, wherein reference numeral 7 designates a metal casing and 8 designates a filler. The inventive composite wire is characterized by the following:

(a) The cross sectional area of a cylindrical hollow to be filled with the filler is not greater than 25% of the entire cross sectional area of the wire.

(b) The filler is composed of the following compounds, parts being by weight for the total weight of the filler.

|  | Parts |
|---|---|
| Ferromanganese | 30–60 |
| Ferrosilicon | 20–40 |
| Ferrotitanium | 0–10 |
| Ferroaluminum | 0–15 |
| Arc stabilizer | 1–10 |

As an arc stabilizer, oxides and salts of alkali metals, such as potassium oxide and potassium oxalate, are used either singly or in combination.

Summarizing the above, the composite wire of this invention is characterized in that it has a cross sectional configuration shown in FIG. 3, that the cross sectional area of the central hollow to be packed with a filler is made sufficiently small in comparison with the entire cross sectional area of the wire, and that the filler is composed, as stated above, of merely deoxidizers consisting of ferromanganese, ferrosilicon, ferrotitanium and ferroaluminum, and an arc stabilizer, and does not contain any slag-forming material.

As compared with the composite wire of the structure shown in FIG. 1, those shown in FIGS. 2 and 3 are obviously advantageous from the manufacturing standpoint, because of the simplicity in structure.

With this in mind, the present inventor has made a further study on a variety of compositions for the filler in relation to welding and other conditions, and consequently found the following facts:

(a) A composite wire of the structure shown in FIG. 2 using as a filler a mixture of a slag-forming composition, deoxidizers and an arc stabilizer, has a reduced weldability due to considerable spattering even when it has a relatively small diameter of, e.g. 1.6 mm. or 2.0 mm., and a high current of not lower than 300 A. of DCRP is employed. Additionally, unmelted filler will project from the wire.

(b) The drawbacks described in the preceding paragraph (a) may be effectively eliminated by containing a large amount of metallic powder in the filler as stated previously.

(c) The spattering mentioned in paragraph (a) may be reduced drastically by making the cross sectional area of the central hollow in the tubular casing sufficiently small and filling said central hollow with only deoxidizers consisting mainly of ferroalloys and a suitable amount of alkali metals as described before.

This is presumably because the force of arc acting against the composite wire is weakened as a result of expansion of the arc generating portion at the tip end of said wire and also because, since the filler does not contain slag-forming material, the causes of spattering are eliminated which would otherwise present by abrupt melting, dissociation and expansion of said materials upon exposure to a high temperature arc without having been preheated.

In this case, the cross sectional area of the central hollow, i.e. the cross sectional area of the portion to be filled by the filler, in excess of 25% of the entire cross sectinoal area not only makes the amount of the filler excessively large but also spattering increases. In other words, it is absolutely essential for the wall thickness of the metal casing to be no smaller than a quarter of the outer diameter of the wire and by so doing the weldability of the wire is enhanced remarkably. In this case, it is to be noted that the cross sectional configuration of the wire is not restricted only to the circular shape as described herein but it may, for example, be of rectangular shape.

The filler may contain therein, besides the compounds mentioned above, an amount of impurities which is not detrimental to the practical use of the wire. Silicon and manganese may be used in the form of simple substance respectively.

(d) In the case of paragraph (c), a better result may be obtained by making the outer diameter of the wire not larger than 2.0 mm. and employing a current density of not lower than 100 A./mm.$^2$ by DCRP.

(e) Considering the mechanical properties of the deposited metal to be obtained, the weight ratio of ferromanganese (of low carbon content containing about 70% of Mn) to ferrosilicon (of low carbon content containing about 40% of Si) is most preferably about 4 to 3, and a total weight of both compounds must be at least 50% of the entire weight of the filler.

With a composite wire wherein the cross sectional area of the central hollow is not greater than 25% of the total cross sectional area, when a total weight of the aforementioned two compounds is not greater than 50% of the weight of the entire filler, blow holes may occasionally be formed in the resultant deposited metal, even when the amounts of ferrotitanium and ferroaluminum are increased. This means that sufficiently large amounts of silicon and manganese are required for obtaining a sound weld, since titanium and aluminum react relatively intensely and do not exist for a long period time.

(f) Ferrotitanium is effectively used as a strong deoxidation agent assisting the function of said manganese and silicon and the use of the same contributes to the formation of a satisfactory weld as well as to the improvement of notch toughness of the weld.

Ferroaluminum, which is also effectively used as a strong deoxidation compound, serves in cooperation with ferrotitanium to adjust the fluidity of the resulting deposited metal and to drastically improve the appearance of the bead in a horizontal fillet weld. In this respect, the best result can be obtained when the ratio of ferrotitanium to ferroaluminum is 2 to 3.

(g) The effect of the arc stablizer, composed of oxides and salts of alkali metals, can be obtained when it is contained in the filler in an amount of the order of 1% or higher of the total weight of the filler. An amount of the arc stabilizer in excess of 10% tends to reduce the melting rate of the wire and that in excess of 20% may cause blow holes in the deposited metal. In this view, the amount of the arc stabilizer effectively used is preferably within the range of 1 to 10% and most preferably within the range of 6 to 8%.

An example of the present invention will be illustrated hereunder.

A welding operation was performed using a composite wire under the conditions described below:
Shield gas: $CO_2$ gas.
Welding power source:
  Direct current reverse
    polarity (DCRP).
Wire:
  Material of casing—mild
    steel (0.15% C).
  Outer diameter—2.0 mm.
Cross sectional area of central hollow:
  16% of the wire outer diameter.
Composition of filler:

|  | Parts by weight |
|---|---|
| Ferromanganese | 43 |
| Ferrosilicon | 33 |
| Ferrotitanium | 6 |
| Ferroaluminum | 10 |
| Arc stabilizer | 8 |

The arc stablizer used consisted of a mixture of sodium oxide with potassium oxalate and the weight of the filler was about 7% of the total weight of the finished wire. The following results were obtained.

(1) A stable arc accompanying less spattering was obtained at a welding current of 300 to 500 A. and the appearance of the bead formed was smooth and satisfactory though it was somewhat convex in shape. No substantial amount of slag was present on the surface of the bead.

(2) A stable short-circuiting welding was posisble at a welding current of 150 to 300 A. by employing a low arc voltage. This has been impossible with conventional composite wires.

(3) As a result of large current horizontal fillet welding, a smooth fillet weld of a leg size as large as 7 to 10 mm. was obtained without the bead dripping.

As will be understood from the foregoing example, it is possible according to the present invention to obtain a composite wire which is simple in structure and excellent in weldability. The inventive composite wire is of economical advantage because it involves less problems in its manufacture and also enables a high deposition efficiency to be obtained owing to the fact that it comprises no slag-forming material.

Moreover, with the inventive composite wire, it is possible to obtain an improved welding rate and an improved weld penetration as it is small in diameter and adapted for use with a high current density. In addition, the inventive composite wire enables short-circuit welding to be achieved, produces less amount of slag and also makes a multi-layer welding possible without previously removing the slag. Thus, the present invention is of great industrial advantage.

What is claimed is:

1. A special welding electrode for use in consumable electrode shield gas arc welding wherein the gas consists primarily of carbon dioxide, comprising: a hollow metal casing, the hollow portion of which has a cross sectional area not greater than 25% of the entire cross sectional area of said electrode; and a filler enclosed in said hollow portion, said filler containing no slag forming ingredients and consisting essentially of 30 to 60 parts by weight of ferromanganese, 20 to 40 parts by weight of ferrosilicon, up to 10 parts by weight of ferrotitanium, up to 15 parts by weight of ferroaluminum, and 1 to 10 parts by weight of an arc stabilizer comprising oxides and salts of alkali metals, the total weight of ferromanganese and ferrosilicon being at least 50% of the total weight of said filler.

2. The welding electrode of claim 1, wherein the weight ratio of ferromanganese:ferrosilicon is 4:3.

3. A special welding electrode for use in consumable electrode shield gas arc welding wherein the gas consists primarily of carbon dioxide, comprising: a hollow metal casing, the hollow portion of which has a cross sectional area not greater than 25% of the entire cross sectional area of said electrode; and a filler enclosed in said hollow portion, said filler containing no slag forming ingredients and consisting essentially of 30 to 60 parts by weight of ferromanganese, 20 to 40 parts by weight of ferrosilicon, an effective amount of up to 10 parts by weight of ferrotitanium, an effective amount of up to 15 parts by weight of ferroaluminum, and 1 to 10 parts by weight of an arc stabilizer comprising oxides and salts of alkali metals, the total weight of ferromanganese and ferrosilicon being at least 50% of the total weight of said filler.

4. The welding electrode of claim 3, wherein the weight ratio of ferrotitanium:ferroaluminum is 2:3.

5. The welding electrode of claim 1, wherein the total weight of arc stabilizer is from 6–8% of the total weight of said filler.

6. The welding electrode of claim 3, wherein the cross sectional area of the hollow portion of said metal casing is 16% of the entire cross sectional area of said electrode, and said filler consists essentially of 43 parts by weight of ferromanganese, 33 parts by weight of ferrosilicon, 6 parts by weight of ferrotitanium, 10 parts by weight of ferroaluminum and 8 parts by weight of arc stabilizer.

7. The welding electrode of claim 6 wherein the arc stabiliber consists of a mixture of sodium oxide and potassium oxalate.

References Cited

UNITED STATES PATENTS

| | | | |
|---|---|---|---|
| 1,501,266 | 7/1924 | Brace | 219—146 |
| 3,309,490 | 3/1967 | Cary | 219—146 X |

JOSEPH V. TRUHE, Primary Examiner

B. A. STEIN, Assistant Examiner